Figure 1:
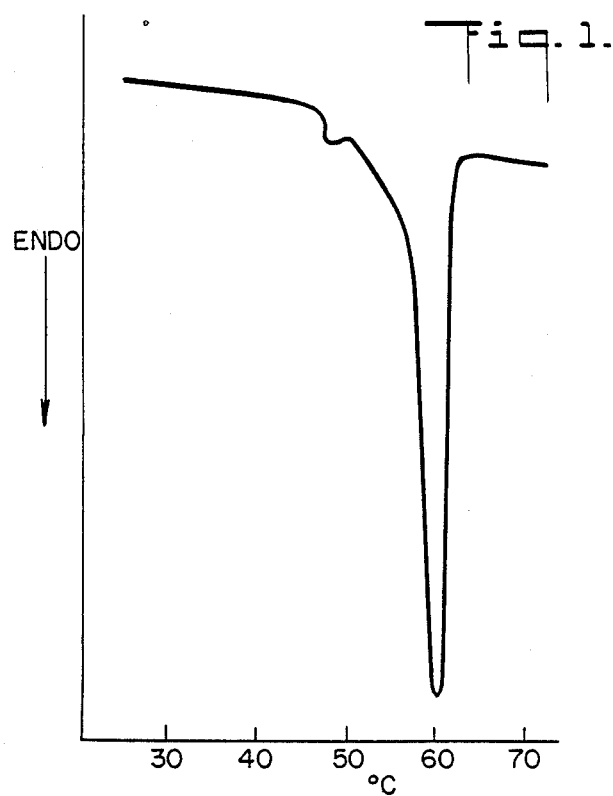

United States Patent [19]

Luddy et al.

[11] Patent Number: 4,880,658

[45] Date of Patent: * Nov. 14, 1989

[54] OBTAINING A FAT FRACTION WITH AZEOTROPIC SOLVENTS

[75] Inventors: Francis E. Luddy, Hatboro, Pa.; Sergio Longhi, Parma, Italy

[73] Assignee: Nestec S.A., Vevey, Switzerland

[*] Notice: The portion of the term of this patent subsequent to Jul. 22, 2003 has been disclaimed.

[21] Appl. No.: 316,477

[22] Filed: Feb. 27, 1989

Related U.S. Application Data

[60] Division of Ser. No. 83,861, Aug. 5, 1987, Pat. No. 4,839,191, which is a continuation of Ser. No. 812,274, Dec. 23, 1985, abandoned, which is a division of Ser. No. 517,508, Jul. 26, 1983, Pat. No. 4,601,857.

[51] Int. Cl.$^4$ .......................... A23D 5/00; C11B 3/00
[52] U.S. Cl. ................... 426/607; 260/428.5
[58] Field of Search ................ 426/607, 608; 260/428.5

[56] References Cited

U.S. PATENT DOCUMENTS

| | | | |
|---|---|---|---|
| 4,018,806 | 4/1977 | Wyness et al. | 260/428.5 |
| 4,072,766 | 2/1978 | Luddy et al. | 426/607 |
| 4,601,857 | 7/1986 | Luddy et al. | 260/428.5 |

*Primary Examiner*—Donald E. Czaja
*Assistant Examiner*—Celine T. Callahan
*Attorney, Agent, or Firm*—Vogt & O'Donnell

[57] ABSTRACT

A process for the fractionation of fats and oils in which the fat or oil is dissolved in a binary azeotropic solvent mixture. The solvent containing the dissolved fat is cooled to a first temperature to crystallize a high melting stearine fraction, and the high melting stearine fraction is removed from the solvent-crystal mixture. If the fractionation process has for its objective the production of a high melting fat and a lower melting fat (oil), the fractionation process is terminated at this point. However, if an intermediate melting solid fraction is the objective, it is desirable in the first crystallization step to remove a smaller portion of high melting stearine fraction and then to cool the remaining solution to a second temperature lower than the first to crystallize an intermediate melting solid fraction. The second crop of crystals is removed from the solvent-crystal mixture by filtration or decantation. The second crystal fraction is of lower melting point than the first fraction and the intermediate melting point fraction has physical properties similar to those of cocoa butter. The fat recovered from the remaining filtrate solution is an oil. The fractionation can be carried out by batch or continuous process.

13 Claims, 11 Drawing Sheets

OBTAINING A FAT FRACTION WITH AZEOTROPIC SOLVENTS

This application is a divisional application of application Ser. No. 07/083,861, filed Aug. 5, 1987, now U.S. Pat. No. 4,839,191 which in turn was a continuing application of application Ser. No. 06/812,274, filed Dec. 23, 1985, now abandoned, which in turn was a divisional application of application Ser. No. 06/517,508, filed July 26, 1983, now U.S. Pat. No. 4,601,857.

This invention relates to an improved process for the solvent fractionation of fats to produce fractions with unique properties suitable for use as speciality fats.

The fractionation process may be a simple one-step crystallization process, (Process 1), which yields only a high melting fraction and an oil or it may be a more elaborate scheme with two crystallization steps to produce three fractions, a high melting fraction, an intermediate or middle melting fraction and an oil (Process 2).

A major objective of Process 2 is to develop a fractionation process in which the intermediate fraction has physical properties similar to those of cocoa butter. Cocoa butter is a very important ingredient in chocolate and as such is one of the most expensive food fats in the world today. It is most unusual among naturally occurring fats in that it has a unique narrow melting range. It is a hard and brittle solid below 25° C., it softens slightly above this temperature and melts sharply and completely at 35°–37° C., corresponding to the temperature of the human body. Because of the relative scarcity of natural cocoa butter, there have been proposed many processes for producing confectionery fats with cocoa butter-like properties from fats such as palm oil or tallow. These processes for the most part have depended on single solvents or on ordinary mixtures of solvents as the solvent phase.

It has now been found that binary azeotropic solvent mixtures are particularly useful for the fractionation of fats. Thus, the present invention provides a process for the solvent fractionation of fats into at least 2 fractions including a first high melting glyceride fraction and a second fraction that is an oil at temperatures above 10° C., the process comprising the steps of:

(a) dissolving the fat in a solvent which is a binary azeotropic solvent mixture, the solvent ratio being from 1.5 to 8.0 ml of solvent per gram of fat;

(b) crystallizing the solution from step (a) at 10°–15° C.;

(c) separately collecting a solvent phase and the precipitate formed in step (b);

(d) extracting the precipitate of step (c) by contacting with fresh solvent cooled to about 2° C. below the temperature of step (b) using at least about 8% of the original volume of solvent;

(e) collecting a solvent phase and a precipitate from step (d), which precipitate is a hard fat fraction having a melting point above 40° C.; and (f) combining the solvent phases from step (c) and step (e) and eliminating solvent therefrom to provide an oil fraction which is liquid above 10° C.

For convenience this process, producing 2 fractions, will be hereinafter designated as Process 1.

In another aspect of the invention, especially suitable for isolating fat fractions having properties similar to cocoa butter and thus useful as confectionery fats, the procedure outlined above is modified by carrying out steps (b) and (d) above at slightly higher temperatures and interposing a second crystallization step. Specifically, this variant of the process comprises:

(a′) disslving the fat in a solvent which is a binary azeotropic solvent mixture, the solvent ratio being from 1.5 to 8.0 ml of solvent per gram of fat;

(b′) crystallizing the solution from step (a′) at 16°–22° C.;

(c′) separately collecting a solvent phase and the precipitate formed in step (b′);

(d′) extracting the collected precipitate of step (c′) by contacting with fresh solvent cooled to a temperature about two degrees lower than the crystallization temperature of step (b′), the amount of solvent being about at least 8% of the original volume of solvent;

(e′) collecting precipitate from step (d′), which precipitate is a hard fat fraction having a melting point above 40° C.;

(f′) crystallizing the solvent phase from step (c′) at a temperature of 2° to 8° C. to form a precipitate;

(g′) separately collecting from step (f′) a solvent phase and a precipitate;

(h′) extracting the precipitate collected in step (g′) by contacting with fresh solvent cooled to a temperature about two degrees lower than the crystallization temperature of step (f′), the amount of solvent being about at least 8% of the original volume of solvent;

(i′) recovering from step (h′) a solvent phase and a semi-solid fat fraction having a melting range above 32° C. and below 42° C.; and (j′) combining the solvent phases of step (g′) and step (i′) and eliminating solvent therefrom to provide an oil fraction.

This variant will be referred to as Process 2.

Preferably, steps (a) and (a′) are effected at temperatures of about 55° to 60° C. to ensure complete dissolution of the fat. The processes of the invention may be applied to fats from animal, vegetable or marine sources, both natural and modified as by catalytic hydrogenation, molecular rearrangement, or both. They are advantageously used for the fractionation of the fats listed in Table 1, especially those marked with an asterisk. Whilst Process 2 may be used to produce confectionery fats, the Process ;b 1 is useful for the winterization of oils. Preferred solvents are the binary azeotropic solvent mixtures shown together with their boiling points (B.P.) in Table 2.

TABLE 1

| | |
|---|---|
| *Palm Oil | Kokum Butter |
| *Palm Oil Stearine | Gamboze Butter |
| Palm Kernel Oil | Sierra Leone Butter |
| Palm Kernel Oil Stearine | Malabar Tallow |
| Grape Seed Oil | Piqui Fat |
| Grape Seed Oil Stearine | Rambutin Tallow |
| Cottonseed Oil | *Beef Fat |
| Cottonseed Oil Stearine | Chicken Fat |
| Soybean Oil | Camel Fat |
| Soybean Oil Stearine | Deer Fat |
| Olive Oil | Horse Fat |
| Olive Oil Stearine | Hippopotamus Fat |
| Corn Oil | *Pork Fat |
| Corn Oil Stearine | Sheep Fat |
| *Cocoa Butter | Goat Fat |
| Borneo Tallow | Goat Milk Fat |
| Chinese Vegetable Fat | Sal Fat |
| Indian Butter | *Butter Fat |
| Illipe Butter | Whey Fat |
| Siak Tallow | Buffalo Milk Fat |
| Mango Kernel Fat | Human Milk Fat |
| Blackcurrant Seed Oil | |

TABLE 2

| No. | Solvent 'A' | % of A | Solvent 'B' | % of 'B' | B.P. (°C.) |
| --- | --- | --- | --- | --- | --- |
| 1 | acetone | 88 | methanol | 12 | 56.4 |
| 2 | acetone | 48 | methyl acetate | 52 | 55.6 |
| 3 | acetone | 20 | n-pentane | 80 | 32.0 |
| 4 | acetone | 59 | n-hexane | 41 | 49.8 |
| 5 | ethanol | 30 | cyclohexane | 70 | 64.9 |
| 6 | ethanol | 21 | n-hexane | 79 | 52.7 |
| 7 | ethanol | 49 | n-heptane | 51 | 70.9 |
| 8 | ethanol | 53 | iso-propyl acetate | 47 | 76.8 |
| 9 | ethanol | 53 | methyl cyclohexane | 47 | 72.0 |
| 10 | ethanol | 40 | methyl ethyl ketone | 60 | 74.8 |
| 11 | ethanol | 5 | n-pentane | 95 | 34.3 |
| 12 | ethanol | 85 | n-propyl acetate | 15 | 78.2 |

The percentages are by weight.

Binary azeotropic solvent mixtures present several advantages not usually found in other solvent systems. Thus, the volumes required are smaller than for single solvents and crystallization temperatures may be higher. As both polar and non-polar solvents are present, greater specificity in the crystallization process has been observed and being azeotropes, the composition of recovered solvent is the same as that of the original. The choice of solvents is such that the fractionation processes can be applied to fats whose natural fatty acid content is as low as 5% and as high as 80%.

The processes of this invention may be carried out either as a batch or a continuous process but for the purpose of simplification only the batch process will be described in the examples. The solvent used in the process may be any of the solvent mixtures listed in Table 1. In each particular application the solvent will be chosen having regard to the fat being fractionated, and especially its fatty acid composition. Thus, solvents having polar characteristics are especially preferred for the fractionation of many fats because they have superior solubilising properties for unsaturated fractions. The three fractions obtainable by the processes of the invention: high melting stearine, semi-soft confectionery fat and oil will be designated, respectively, as P-1, P-2 and F-1 or F-2 (depending on the process). To facilitate understanding it should be observed that, in Process 1, fraction P-1 is obtained in step (e) and fraction F-1 in step (f), this process producing only 2 fractions, whereas in Process ;b 2 fraction P-1 is the precipitate collected in step (e'), fraction P-2 in step (i') and the oil F-2 comes from step (j').

Figure 21:
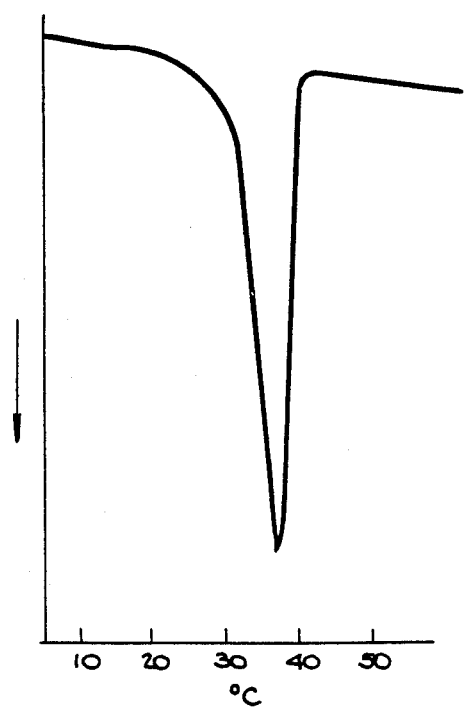

The physical characteristics of different fractions are defined by Differential Scanning Calorimetry (DSC) in the form of melting profile curves. In the accompanying drawings, the endothermy (heat absorbed) is plotted on the ordinates and the temperature on the absicissae. The DSC Thermal Profiles shown in FIGS. 1 to 20 are those of fractions obtained from different fats as described in the Examples. FIG. 21 shows the DSC thermal profile of cocoa butter and is givenn for reference purposes.

| FIG. | Example | Fat used | Process | Fraction |
| --- | --- | --- | --- | --- |
| 1 | 1 | Palm oil | 1 | P-1 |
| 2 | 1 | " | 1 | F-1 |
| 3 | 2 | Palm oil stearine | 1 | P-1 |
| 4 | 2 | " | 1 | F-1 |
| 5 | 3 | Palm oil | 2 | P-1 |
| 6 | 3 | " | 2 | P-2 |
| 7 | 3 | " | 2 | F-2 |
| 8 | 4 | Palm oil stearine | 2 | P-1 |
| 9 | 4 | " | 2 | P-2 |
| 10 | 4 | " | 2 | F-2 |
| 11 | 5 | Butter fat | 2 | P-1 |
| 12 | 5 | " | 2 | P-2 |
| 13 | 5 | " | 2 | F-2 |
| 14 | 6 | Beef fat | 2 | P-1 |
| 15 | 6 | " | 2 | P-2 |
| 16 | 6 | " | 2 | F-2 |
| 17 | 7 | Pork fat | 2 | P-1 |
| 18 | 7 | " | 2 | P-2 |
| 19 | 7 | " | 2 | F-2 |
| 20 | 8 | Cocoa butter | 1 | P-1 |

While a major consideration of this invention is the production and use of fat fractions in edible products, its usefulness is apparent in many non-food uses. For example, the major product in the fractionation of palm oil by Process 1, the liquid oil fraction F-1, a clear, pumpable oil is suitable for lubricant oils, particularly "cutting oils", core oils in the metal coating industry, textile oils, tanning oils, plasticizers, and as a diesel oil extender or replacer. The high melt fraction P-1 may be used as a source of high molecular weight fatty acids. These same fractions have also many food uses, such as the use of the high melt fraction P-1 as the stiffening fat in shortenings, as a solid phase in vegetable based margarines and the use of the oil fraction F-1 as a frying or salad oil.

The fractions P-1, P-2 and F-2 are examples of the type of products obtainable by fractionating fats according to Process 2. For example, 1-99% of the semi-solid fat fraction P-2, may be combined with 1-99% of cocoa butter to form a confectionery fat. A confectionery fat having a higher melting point than cocoa butter can be produced by a blend from 5-25% of the high melting fraction P-1 and from 75-95% of the fraction P-2. In addition, 1-99% of the last produced confectionery fat can be blended with 1-99% of cocoa butter to form another confectionery fat of higher melting range. The liquid oil fraction, F-2, can be used to produce a cooking or frying oil by mixing with 1-99% of for example olive oil, soy bean oil, corn oil, palm oil, safflower oil, sunflower oil, rape seed oil or peanut oil. As each of the fractions P-1, P-2 and F-2 from Process 2 has widely differing physical properties, they may be used as base materials for a wide variety of cosmetic or pharmaceutical products. Finally, the fractions obtainable by Process 2 may be subjected to chemical or enzymatic hydrolysis to provide a source of fatty acids of low and high molecular weight, depending on the fat originally used.

The invention is illustrated by the following examples, in which percentages are expressed on a weight basis.

EXAMPLE 1

Figure 2:
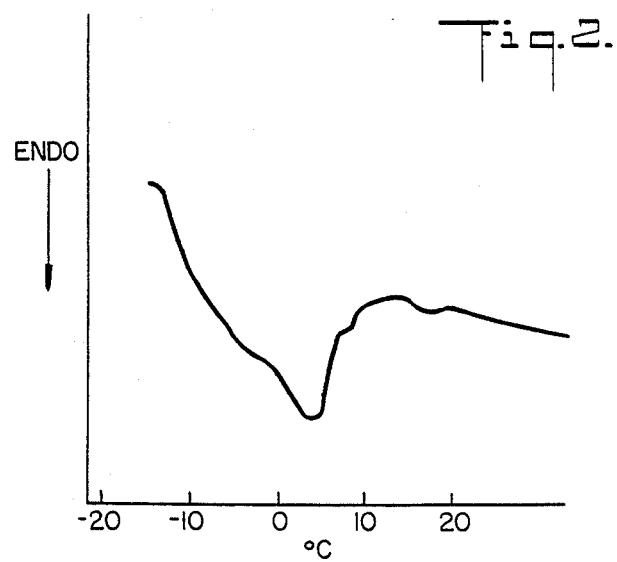

A mixture of 1 kg of melted palm oil and 3000 ml of the binary azeotropic solvent, ethanol/methyl ethyl ketone (40:60 by volume weight), is heated until all of the palm oil is dissolved. The solution is transferred to a crystallizer equipped with a stirrer and cooling coils. At first, the solution is stirred rapidly t 150 RPM to effect rapid heat transfer, but as the temperature of the solution drops, stirring is gradually decreased to 75 RPM and at the first sign of crystals, the stirring is reduced to 35 RPM. The cooling medium in the coils is maintained at no more than a 5° C. differential between the cooling medium and the crystallizer except for the final crystallization temperature when the differential is only 2° C. The solution temperature is thus lowered gradually over a period of one hour to 12° C. Crystallization starts at about 28° C. and becomes heavy at 18° C. When the temperature reaches 12° C., the mixture of solvent and crystals is held for an additional 15 minutes. During this period stirring is discontinued and the fat crystals settle rapidly to the bottom of the crystallizer. Most of the clear supernatant liquid is removed by syphoning using a light vacuum, and the remaining filtrate and precipitate are filtered also under slight vacuum. The filter cake is transferred to a wash vessel and about 300 ml of fresh solvent are added with stirring. The resultant slurry is immediately filtered using slight vacuum. The precipitate fraction P-1, and the combined filtrates are individually treated, first in an evaporator and then a deodorizer. The yield of liquid oil, F-1, is 880 g. The yield of high melt stearine, P-1, is 120 g. Table 3 lists the yields of stearine and oil, P-1 and F-1, and the fatty acid percentage composition of the original palm oil and the palm oil fractions. The DSC thermal curve of the stearine fraction F-1, FIG. 1, indicates that this fraction melts at about 60° C.; FIG. 2 indicates that the oil fraction F-1 is liquid above 6° C.

TABLE 3

| | Fraction | | |
|---|---|---|---|
| | P-1 | F-1 | Original fat |
| Yield: | 12% | 88% | |
| % fatty acid composition*: | | | |
| Myristate | 1.7 | 0.9 | 1.0 |
| Palmitate | 70.0 | 43.9 | 47.1 |
| Stearate | 6.0 | 3.7 | 4.0 |
| Oleate | 20.1 | 40.6 | 38.0 |
| Linoleate | 1.4 | 10.0 | 9.0 |
| Others | 0.8 | 0.9 | 0.9 |

*Calculated throughout as methyl esters

*Calculated throughout as methyl esters

EXAMPLE 2

Figure 3:
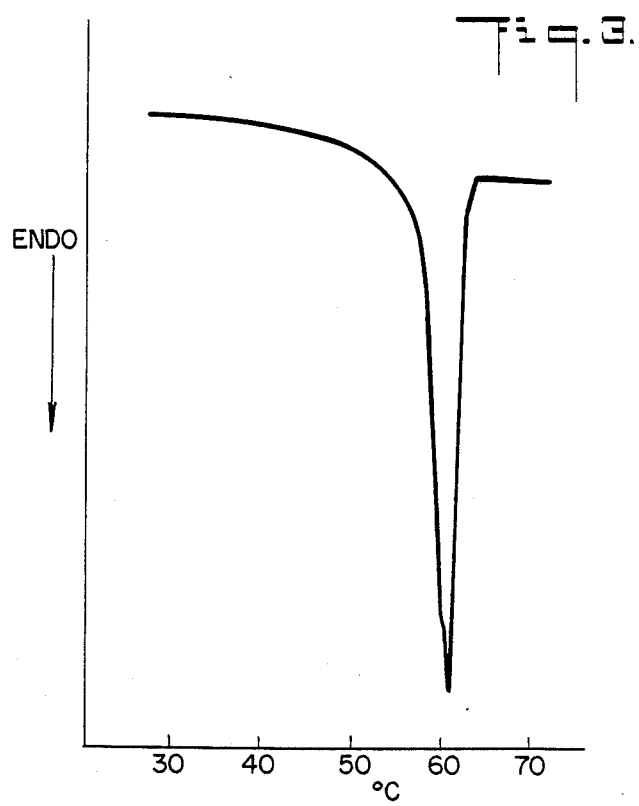
Figure 4:
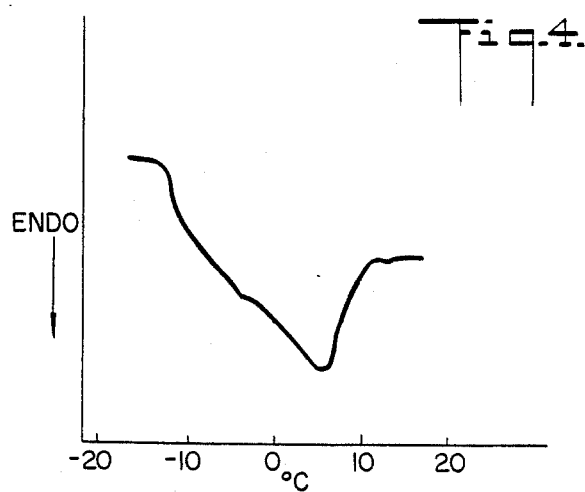
Figure 5:
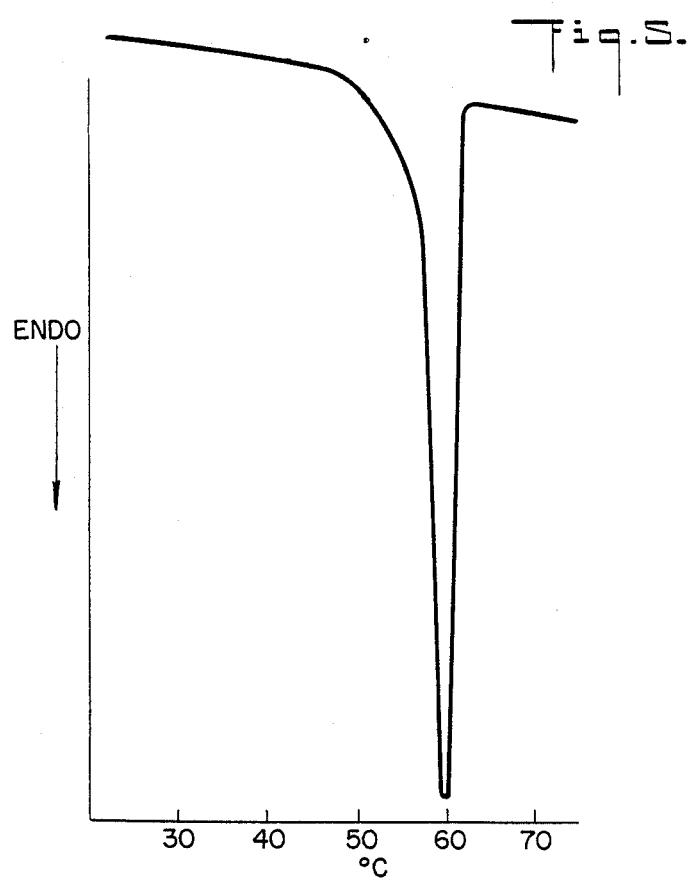
Figure 6:
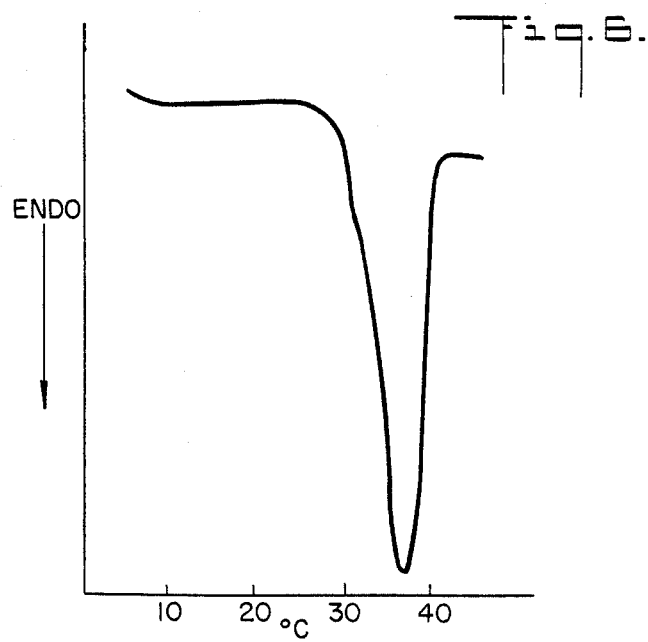
Figure 7:
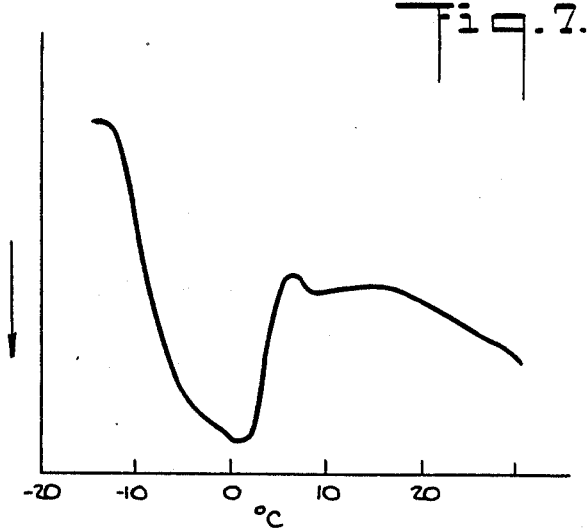
Figure 8:
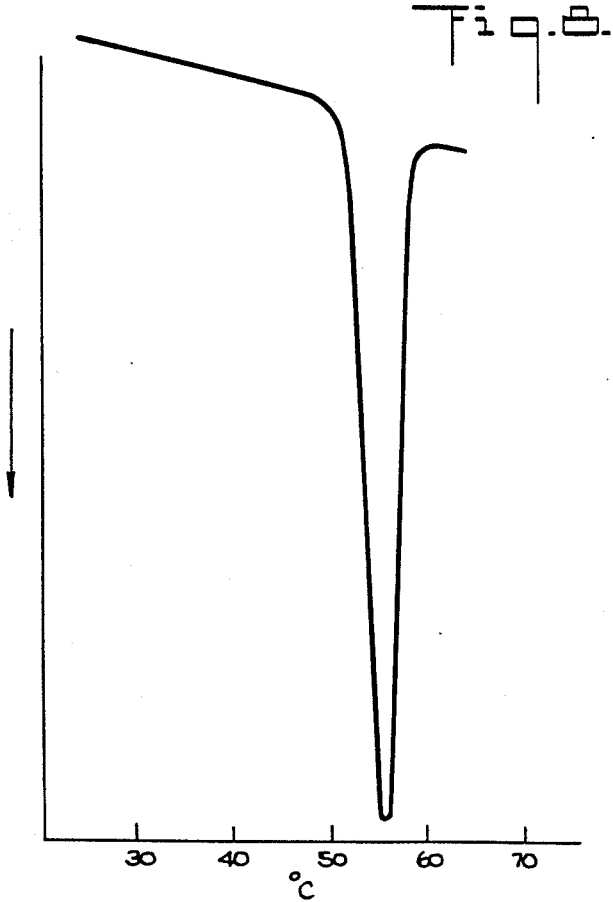
Figure 9:
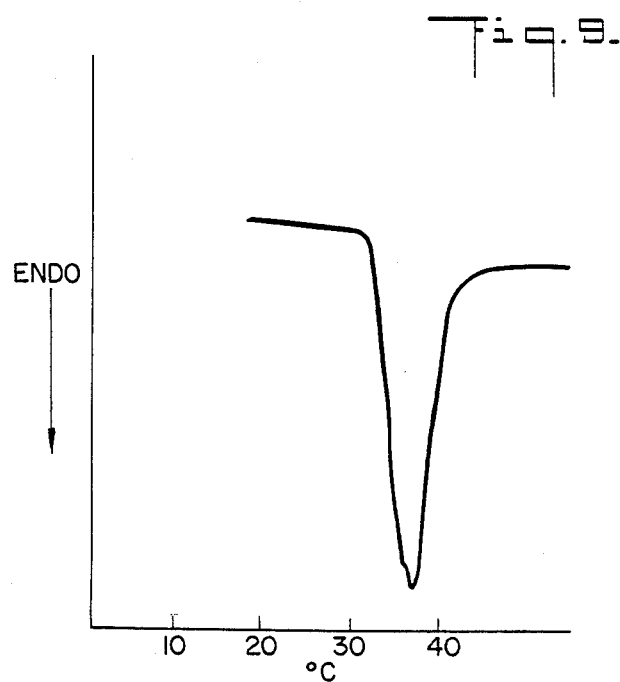
Figure 10:
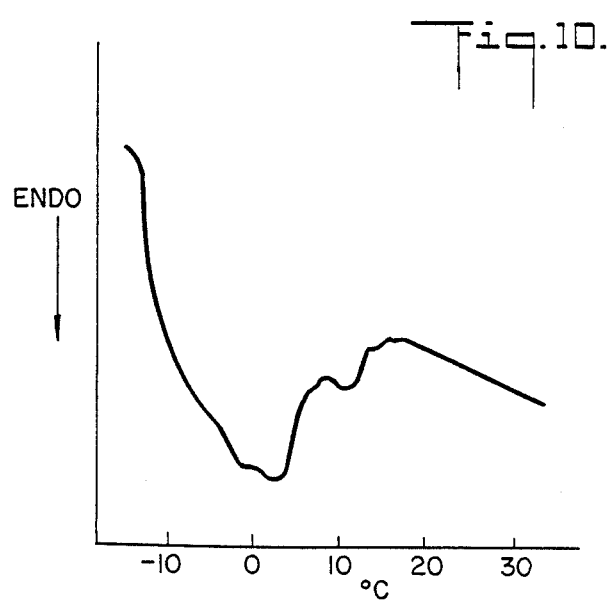
Figure 11:
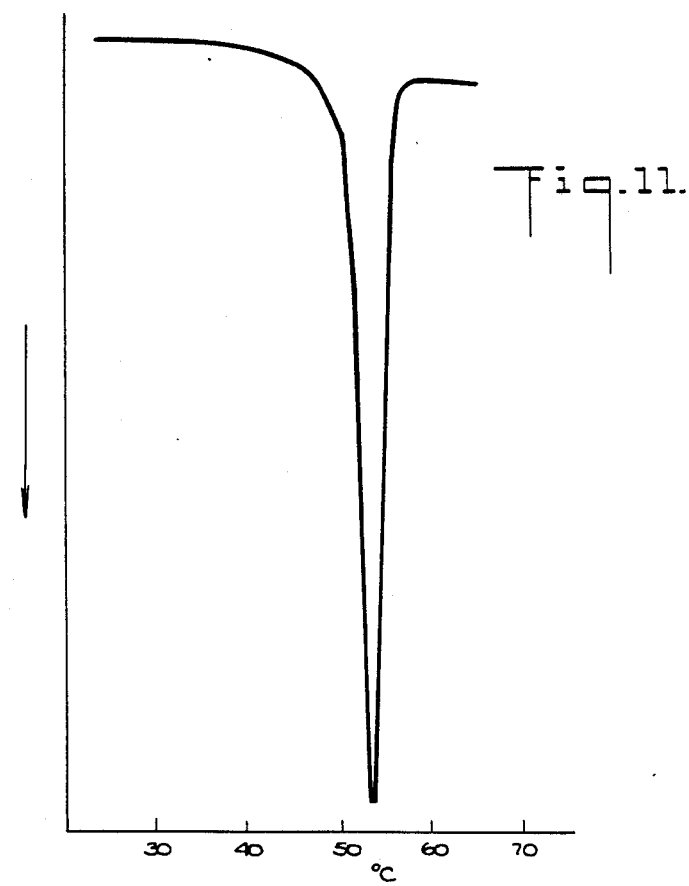
Figure 12:
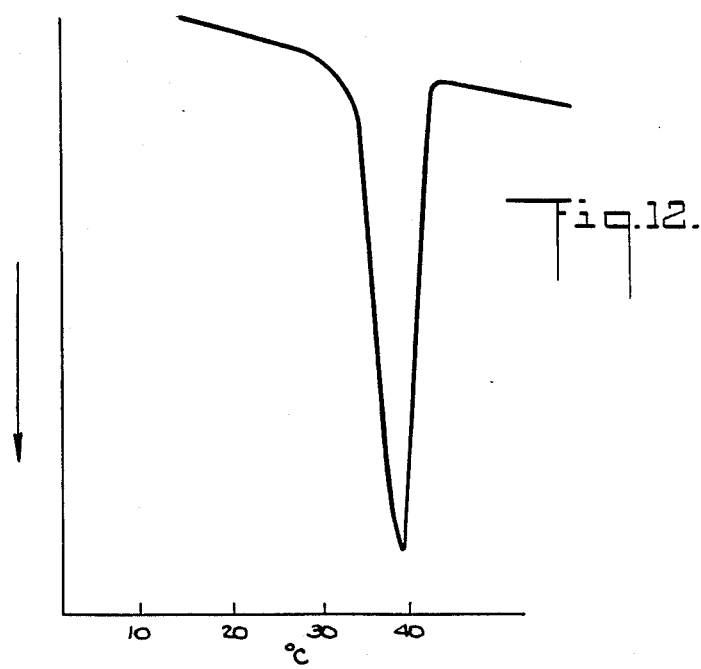
Figure 13:
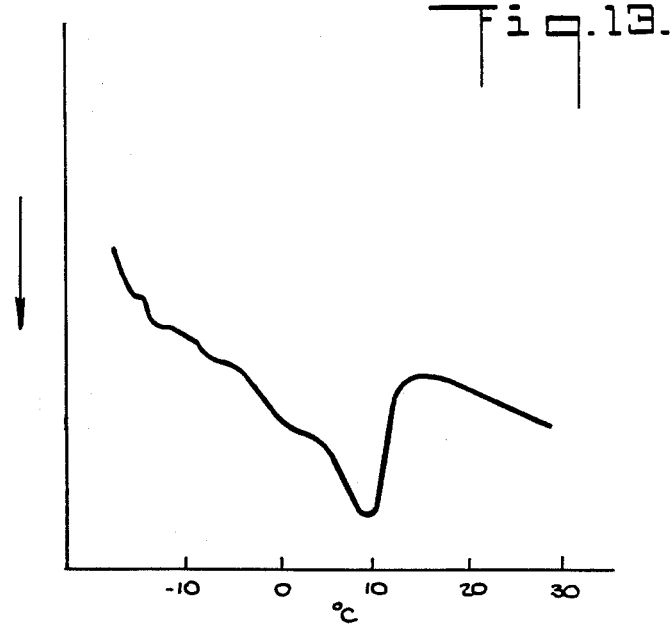
Figure 14:
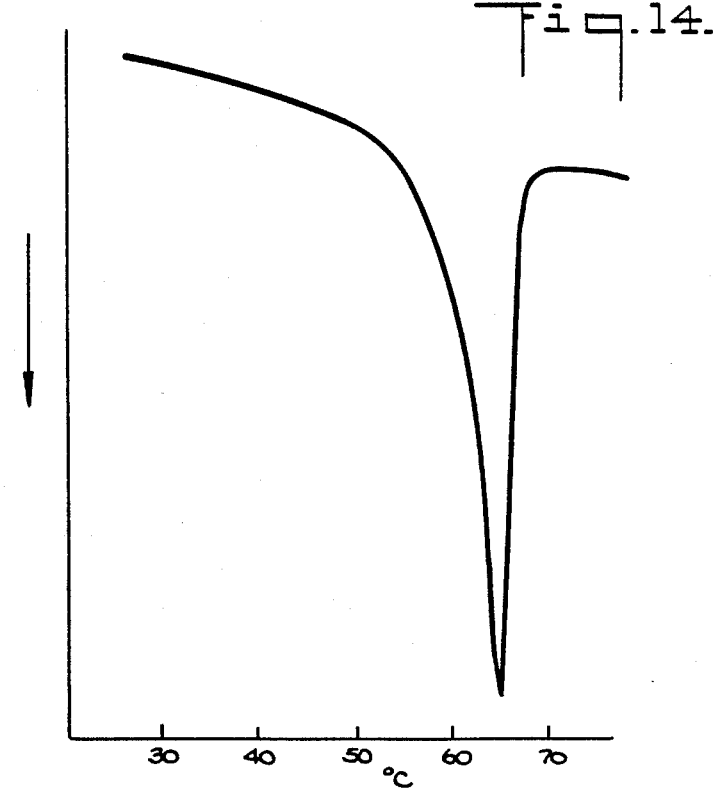
Figure 15:
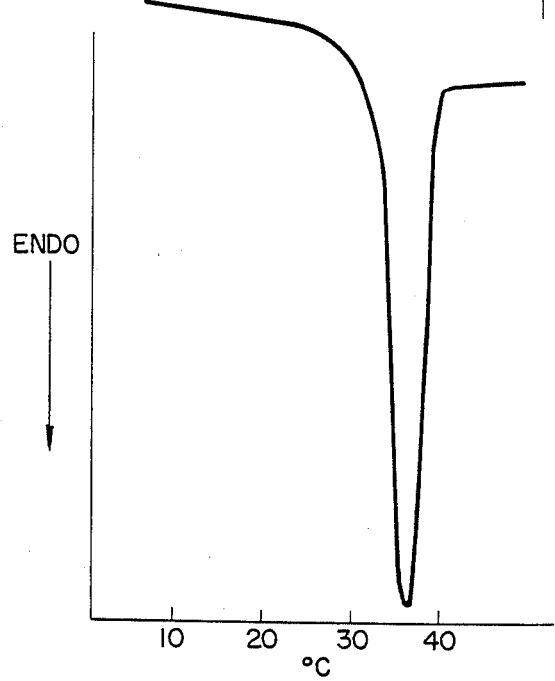
Figure 16:
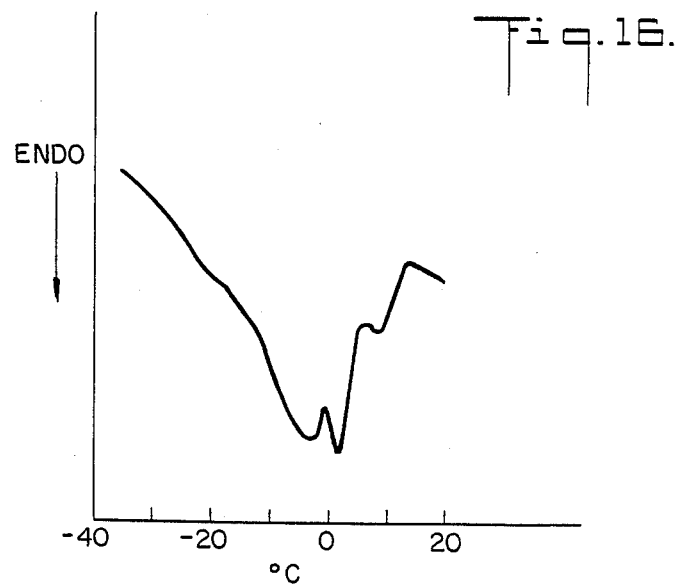
Figure 17:
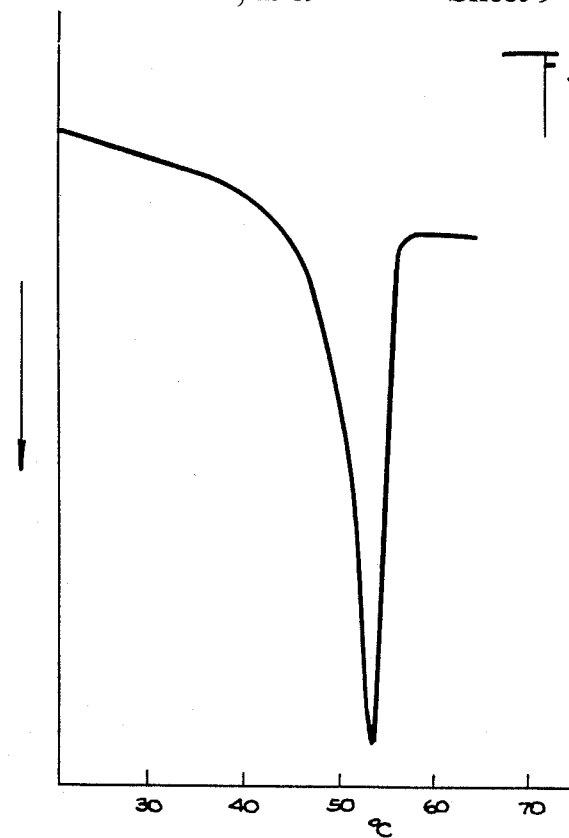
Figure 18:
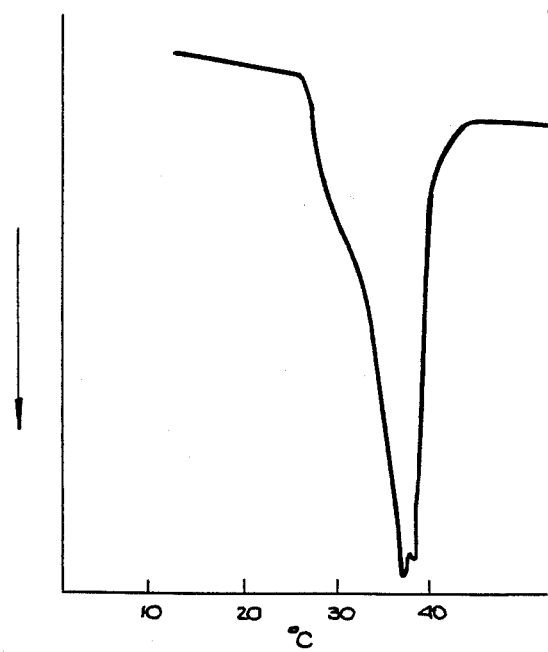
Figure 19:
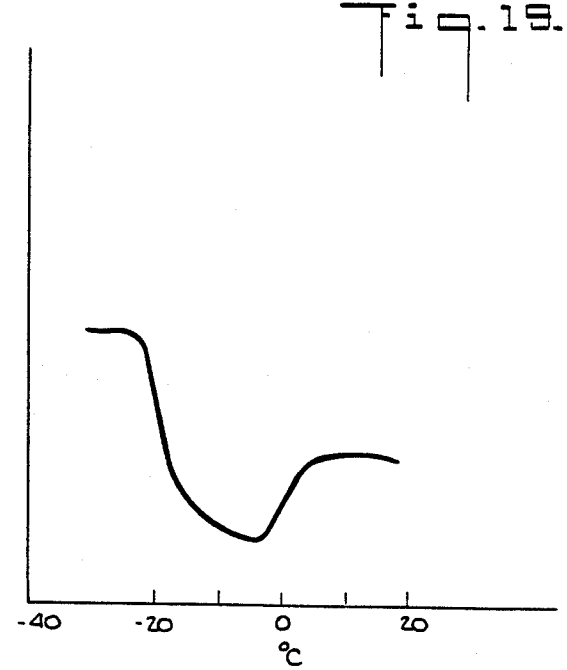
Figure 20:
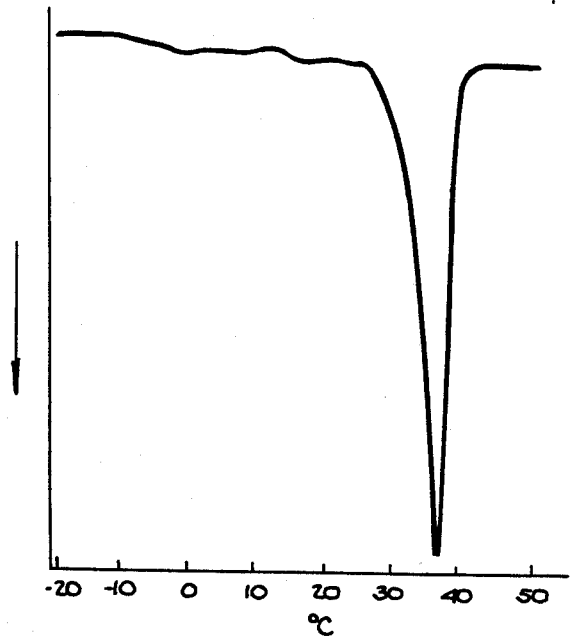

A mixture of 1 kg of palm oil stearine and 3000 ml of the binary azeotropic solvent mixture, ethanol/methyl ethyl ketone, is heated until all of the palm oil is dissolved. The solution is crystallized in essentially the manner described in Example 1. The yield of high melt stearine, P-1, is 280 g and the yield of the oil fraction, F-1, 720 g. Table 4 lists the yields of the fractions and their fatty acid compositions, together with that of the original palm oil stearine. FIG. 3 shows the DSC thermal profile, of the stearine fraction P-1, indicating that it melts at about 62° C. The DSC thermal profile of the oil fraction F-1 in FIG. 4 indicates that it is liquid above 8° C.

TABLE 4

| | Fraction | | |
|---|---|---|---|
| | P-1 | F-1 | Original fat |
| Yield: | 28% | 72% | |
| % fatty acid composition: | | | |
| Myristate | 1.0 | 0.8 | 1.0 |
| Palmitate | 67.0 | 51.9 | 56.1 |
| Stearate | 6.5 | 7.1 | 6.9 |
| Oleate | 20.1 | 31.3 | 28.2 |
| Linoleate | 2.1 | 7.8 | 6.2 |
| Others | 3.3 | 1.1 | 1.6 |

EXAMPLE 3

A mixture of 1 kg of melted palm oil and 3000 ml of the binary azeotropic solvent mixture, ethanol/methyl ethyl ketone, is heated until all of the palm oil is dissolved. The solution is transferred to a crystallizer equipped with a stirrer and cooling coils. The solution is stirred rapidly to effect good heat transfer. As the temperature of the solution is gradually lowered, stirring is also gradually decreased from 150 RPM to 75 RPM. At the first sign of crystals the stirring is further decreased to 35 RPM. The cooling medium in the coils is maintained at no more than a 5° C. differential between the cooling medium and the crystallizer temperature except for the final temperature of 18° C. when the differential is only 2° C. The solution temperature is thus gradually lowered from about 40° C. to 18° C. over a period of about one hour. Crystallization begins at about 28° C. and becomes heavy at 22° C. When the temperature reaches 18° C., stirring is discontinued and the mixture allowed to crystallize during an additional 15 minutes. During this time the fat crystals settle rapidly to the bottom of the crystallizer. Most of the clear supernatant solution is removed by syphoning with slight vacuum and the remaining precipitate and filtrate mixture is then filtered again using slight vacuum. The filter cake is transferred to a wash vessel and 300 ml of fresh solvent previously cooled to 16° C. are added with stirring. The resultant slurry is immediately filtered as before. The precipitate (high melting stearine) fraction, P-1, is treated first in an evaporator and then a deodorizer. The yield of fraction P-1 is 81 g. The stirring rate is adjusted to 150 RPM and the temperature of the crystallizer gradually lowered over a period of one hour to 6° C. with the stirring rate being lowered over this period to 35 RPM. Crystallization begins at about 12°-14° C. and becomes heavy at 10° C. When the temperature reaches 6° C. stirring is stopped and the solvent-crystal mixture allowed to crystalline during an additional 15 minutes. During this period most of the crystals settle to the bottom of the crystallizer. The clear supernatant solvent layer is removed under vacuum as before. The filter cake is transferred to a wash vessel and about 300 ml of fresh solvent previously cooled to about 4° C. added with stirring. The resultant slurry is immediately filtered using slight vacuum. The collected precipitate (fraction P-2) and the combined filtrates are treated individually first in an evaporator and then in a deodorizer. The yield of mid-melting confectionery fat fraction P-2 is 254 g and the yield of the liquid oil, fraction F-2 is 665 g. Table 5 lists the yields of fractions P-1, P-2 and F-2, and the fatty acid compositions of the original palm oil and of the fractions. The DSC thermal profile curve of fraction P-1 indicates that this fraction melts at 60° C., FIG. 6, the thermal profile of the confectionery fat fraction, P-2, shows this fraction to melt at 37°-38° C. and FIG. 7, the DSC thermal profile of the oil fraction, F-2, indicates that it will be totally liquid (SFI=0) above 8° C.

TABLE 5

| | Fraction | | | |
|---|---|---|---|---|
| | P-1 | P-2 | F-2 | Original fat |
| Yield: | 8.1% | 25.4% | 66.5% | |
| % fatty acid composition: | | | | |
| Myristate | 1.3 | 1.0 | 1.0 | 1.0 |
| Palmitate | 80.4 | 54.0 | 40.3 | 47.0 |
| Stearate | 6.3 | 6.8 | 2.5 | 3.9 |

TABLE 5-continued

| | Fraction | | | |
|---|---|---|---|---|
| | P-1 | P-2 | F-2 | Original fat |
| Oleate | 9.8 | 33.9 | 42.7 | 37.9 |
| Linoleate | 1.6 | 3.3 | 12.4 | 9.2 |
| Others | 0.6 | 1.0 | 1.1 | 1.0 |

EXAMPLE 4

A mixture of 1 kg of melted palm oil stearine and 3000 ml of the binary azeotropic solvent mixture, ethanol/methyl ethyl ketone is heated until all of the palm oil stearine is dissolved. The fractionation is carried out essentially as described in Example ;b 3. Table 6 shows the fractionation yields: stearine fraction, P-1, =260 g, mid-melting confectionery fat fraction, P-2, =250 g, and oil fraction, F-2, =490 g. Table 6 also lists the fatty acid compositions of the original palm oil stearine and of the fractions. The DSC thermal profile, FIG. 8, of fraction P-1 indicates that it melts at about 57° C., that in FIG. 9 of the confectionery fat fraction indicates a melting point of about 38° C. and the DSC thermal profile of the oil fraction F-2 (FIG. 10) shows that it is totally liquid at temperatures above 10° C.

TABLE 6

| | Fraction | | | |
|---|---|---|---|---|
| | P-1 | P-2 | F-2 | Original fat |
| Yield: | 26.0% | 25.0% | 49.0% | |
| % fatty acid composition: | | | | |
| Myristate | 1.3 | 1.0 | 0.8 | 1.0 |
| Palmitate | 80.1 | 52.1 | 46.4 | 56.1 |
| Stearate | 6.3 | 6.7 | 7.3 | 6.9 |
| Oleate | 9.4 | 36.6 | 32.8 | 28.0 |
| Linoleate | 1.0 | 1.5 | 11.1 | 6.2 |
| Others | 1.9 | 2.1 | 1.6 | 1.8 |

EXAMPLE 5

A mixture of 1 kg of melted butter fat and 3000 ml of the binary azeotropic solvent, ethanol/methyl ethyl ketone, is heated until all of the butter fat is in solution (about 55°-60° C.). Fractionation is carried out essentially as described in Example 3. Table 7 shows the fractionation yields: stearine fraction P-1=76 g, mid-melting confectionery fat fraction P-2=164 g, and oil fraction F-2=760 g. Table 7 also lists the fatty acid compositions of the original buffer fat and its fractions. The DSC thermal profile, FIG. 11, of the stearine, fraction P-1, indicates that it melts at about 54° C. The DSC thermal profile, FIG. 12, for the confectionery fat fraction P-2 indicates a melting point of about 39° C., and FIG. 13 indicates that fraction F-2 is liquid above 11° C.

TABLE 7

| | Fraction | | | |
|---|---|---|---|---|
| | P-1 | P-2 | F-1 | Original fat |
| Yield: | 7.6% | 16.4% | 76% | |
| % fatty acid composition: | | | | |
| Butyrate | 0.5 | 0.7 | 4.1 | 3.3 |
| Caproate | 0.5 | 0.8 | 2.0 | 1.7 |
| Caprylate | 0.4 | 0.9 | 1.9 | 1.6 |
| Caprate | 1.3 | 1.9 | 2.8 | 2.5 |
| Laurate | 2.2 | 2.9 | 3.1 | 3.0 |
| Myristate | 11.2 | 9.5 | 10.0 | 10.0 |
| Palmitate | 41.0 | 38.0 | 23.6 | 27.3 |
| Palmitoleate | 2.4 | 2.5 | 5.8 | 5.0 |
| Stearate | 24.3 | 21.0 | 9.6 | 12.6 |
| Oleate | 9.4 | 16.0 | 31.3 | 27.1 |

TABLE 7-continued

| | Fraction | | | |
|---|---|---|---|---|
| | P-1 | P-2 | F-1 | Original fat |
| Linoleate | — | 1.2 | 2.8 | 2.3 |
| Others | 6.8 | 4.6 | 3.0 | 3.6 |

EXAMPLE 6

A mixture of 1 kg of melted beef fat and 3000 ml of the binary azeotropic solvent, ethanol/methyl ethyl ketone, is heated until all of the beef fat has dissolved. The fractionation is carried out essentially as described in Example 3. Table 8 shows the fractionation yields: stearine fraction P-1=226 g, confectionery fat fraction P-2=193 g, and oil fraction F-2=581 g. The DSC thermal profiles, FIGS. 14, 15 and 16, indicate that the stearine fraction P-1 melts at about 65° C., the confectionery fat fraction P-2 at about 37°-38° C. and that the oil fraction F-2 is totally liquid above 10° C. Table 8 also lists the fatty acid compositions of the starting fat and of its fractions.

TABLE 8

| | Fraction | | | |
|---|---|---|---|---|
| | P-1 | P-2 | F-2 | Original fat |
| Yield: | 22.6% | 19.3% | 58.1% | |
| % fatty acid composition: | | | | |
| Myristate | 4.5 | 4.1 | 2.1 | 3.6 |
| Palmitate | 38.1 | 28.4 | 19.0 | 25.1 |
| Palmitoleate | 1.4 | 2.0 | 6.4 | 4.4 |
| Stearate | 39.6 | 28.8 | 9.3 | 19.9 |
| Oleate | 13.0 | 33.4 | 56.7 | 42.3 |
| Linoleate | 0.4 | 1.2 | 3.8 | 2.5 |
| Others | 3.0 | 2.1 | 2.7 | 2.2 |

EXAMPLE 7

A mixture of 1 kg of melted pork fat and 3000 ml of the binary azeotropic solvent, ethanol/methyl ethyl ketone, is heated until all of the pork fat is dissolved. Fractionation is carried out essentially as described in Example 3. Table 9 shows the fractionation yields: stearine fraction, P-1=120 g. confectionery fat fraction, P-2=280 g, and oil fraction, F-2=600 g. Table 9 also lists the fatty acid compositions of the original pork fat and of the fractions. The DSC thermal profiles, FIGS. 17, 18 and 19 indicate that the stearine fraction P-1 melts at 53° C., the confectionery fat fraction P-2 at about 38°-39° C. and that the oil fraction F-2 is totally liquid above 7° C.

TABLE 9

| | Fraction | | | |
|---|---|---|---|---|
| | P-1 | P-2 | F-2 | Original fat |
| Yield: | 12.0% | 28.0% | 60.0% | |
| % fatty acid composition: | | | | |
| Myristate | 1.7 | 1.3 | 5.1 | 3.6 |
| Palmitate | 36.6 | 33.4 | 18.9 | 25.1 |
| Palmitoleate | 1.4 | 3.5 | 5.4 | 4.4 |
| Stearate | 39.4 | 30.5 | 11.1 | 19.9 |
| Oleate | 18.0 | 25.9 | 54.8 | 42.3 |
| Linoleate | 2.0 | 3.7 | 2.0 | 2.5 |
| Others | 0.9 | 1.7 | 2.7 | 2.2 |

EXAMPLE 8

300 g of cocoa butter and 600 ml of binary azeotropic solvent (acetone-methanol, 88:12 by weight) are heated until all the fat is dissolved. The solution is then cooled as described in Example 1 down to temperature of 15° C. and the solid and liquid phases are separated. The precipitate is washed once with 50 ml of the same solvent cooled to 12°–13° C. For comparison purposes, a precipitate obtained in the same manner is washed six times with 50 ml portions of solvent. Analysis shows that the two washed precipitates have the same compositions, confirming that only a single wash with 50 ml of solvent is necessary. In this one-step fractionation procedure 245 g of solid fraction, P-1, and 55 g of liquid fraction, F-1, are obtained. Table 10 gives the yields and compositions of the recovered fractions.

TABLE 10

|  | Fraction | | |
| --- | --- | --- | --- |
|  | P-1 | F-1 | Original fat |
| Yield: | 82% | 18% |  |
| % fatty acid composition: | | | |
| Myristate | 0.9 | 1.2 | 0.8 |
| Palmitate | 29.3 | 18.3 | 24.4 |
| Stearate | 41.2 | 27.5 | 34.9 |
| Oleate | 27.4 | 48.3 | 37.6 |
| Linoleate | 1.2 | 4.7 | 2.3 |

The DSC thermal profile of fraction P-1 (FIG. 20) shows a sharp melting point of 34.6° C.

We claim:

1. A process for preparing a fat fraction comprising:
   (a) dissolving a fat in a binary azeotropic solvent mixture wherein the volume of solvent is from 1.5 ml to 8.0 ml per gram of fat;
   (b) cooling the solution from step (a) to 16° C. to 22° C. to form a precipitate;
   (c) separating the precipitate and solvent phase of step (b);
   (d) washing the precipitate from step (c) with fresh solvent mixture which has been cooled to about 2° C. below the solvent temperature utilized in step (b) using a volume of at least about 8% of the volume of solvent utilized in step (b); and
   (e) separating the washed precipitate and solvent phase of step (d) for obtaining a solid fat fraction.

2. A process for preparing a fat fraction comprising:
   (a) dissolving a fat in a binary azeotropic solvent mixture wherein the volume of solvent is from 1.5 ml to 8.0 ml per gram of fat;
   (b) cooling the solution from step (a) to 10° C. to 15° C. to form a precipitate;
   (c) separating the precipitate and solvent phase of step (b);
   (d) washing the precipitate from step (c) with fresh solvent mixture which has been cooled to about 2° C. below the solvent temperature utilized in step (b) using a volume of at least about 8% of the volume of solvent utilized in step (b); and
   (e) separating the washed precipitate and solvent phase of step (d) for obtaining a solid fat fraction.

3. A process according to claim 1 or 2 wherein the dissolution of step (a) is effected at a temperature of about 55° C. to 60° C.

4. A process according to claim 1 or 2 in which the solvent is an azeotropic mixture of any one of the following solvent pairs: acetone/methanol, acetone/methyl acetate, acetone/n-pentane, acetone/n-hexane, ethanol/cyclohexane, ethanol/n-hexane, ethanol/n-heptane, ethanol/iso-propyl acetate, ethanol/methyl cyclohexane, ethanol/methyl ethyl ketone, ethanol/n-pentane, ethanol/n-propyl acetate.

5. A process according to claim 1 or 2 in which the solvent is an azeotropic mixture of ethanol and methyl ethyl ketone (B.P. 74.8° C.) or of methanol and acetone (B.P. 56.4° C.).

6. A process according to claim 1 or 2 in which the fat dissolved is selected from a group consisting of palm kernel oil, palm kernel oil stearine, graps seed oil, grape seed oil stearine, cottonseed oil, cottonseed oil stearine, soybean oil, soybean oil streaine, olive oil, olive oil stearine, corn oil, corn oil stearine, borneo tallow, chinese vegetable fat, indian butter, illipe butter, siak tallow, mango kernal fat, black-currant seed oil, kokum butter, gumbos butter, Sierra Leone butter, malabar tallow, piqui fat, rambutin tallow, chicken fat, camel fat, deer fat, horse fat, hippopotamus fat, sheep fat, goat fat, goat milk fat, sal fat, whey fat, buffalo milk fat and human milk fat.

7. A process according to claim 1 or 2 in which the fat is palm oil, palm oil stearine, beef fat, pork fat, butter fat or cocoa butter.

8. The product of the process of claim 1 or claim 2.
9. The product of the process of claim 3.
10. The product of the process of claim 4.
11. The product of the process of claim 5.
12. The product of the process of claim 6.
13. The product of the process of claim 7.

* * * * *